H. S. BERGEN.
WEIGHING SCALE.
APPLICATION FILED OCT. 23, 1916.
1,378,087.
Patented May 17, 1921.
2 SHEETS—SHEET 1.
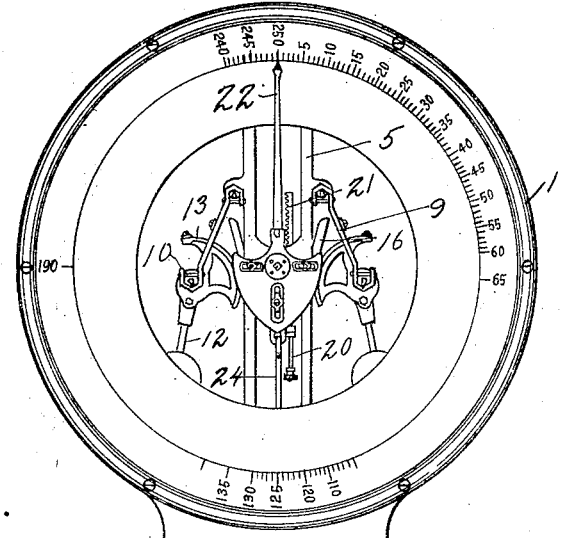
Fig.1.
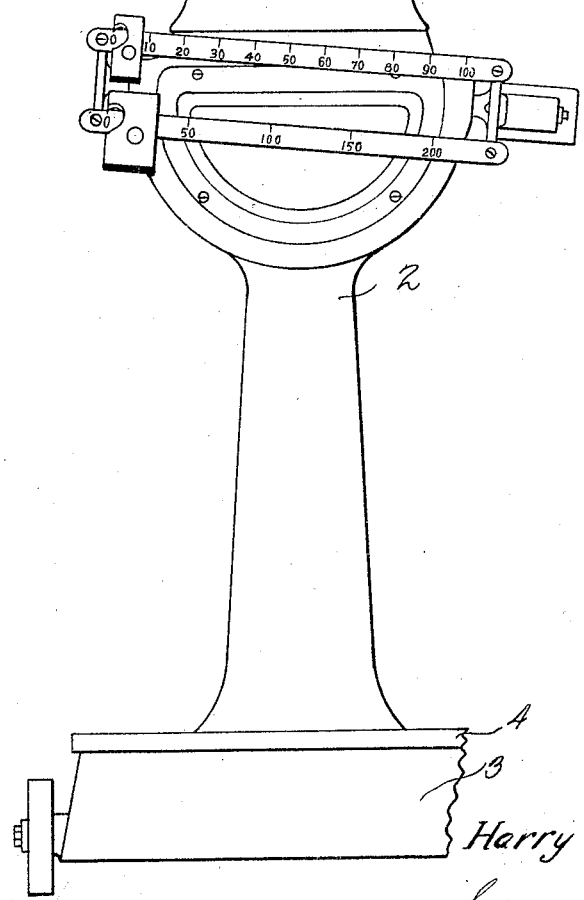
INVENTOR.
Harry S. Bergen.
by George R. Frye Atty

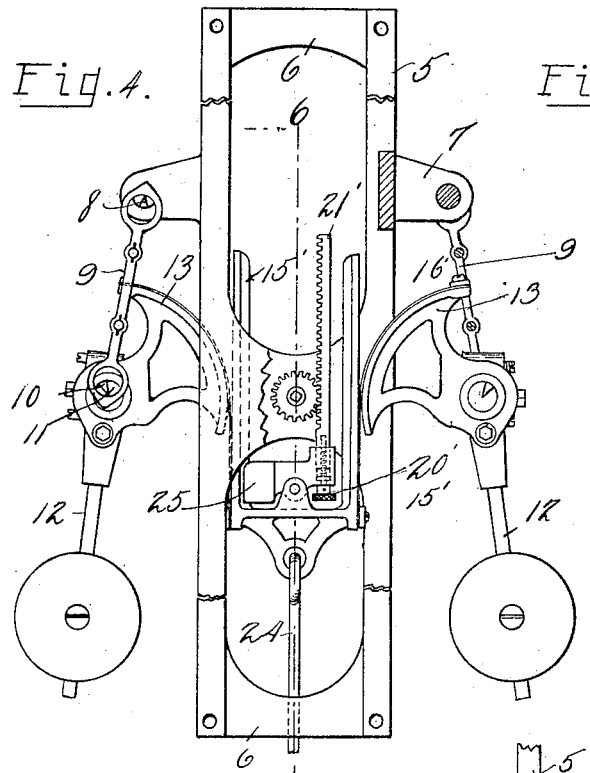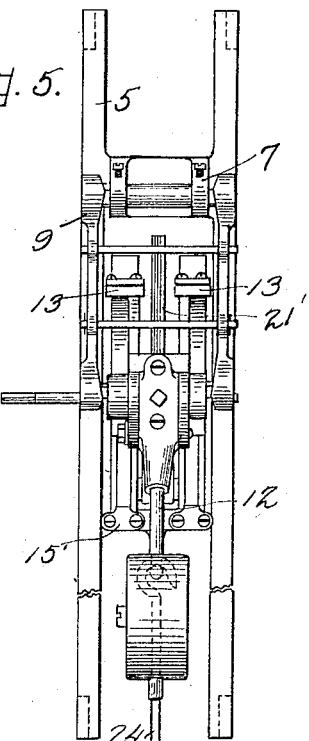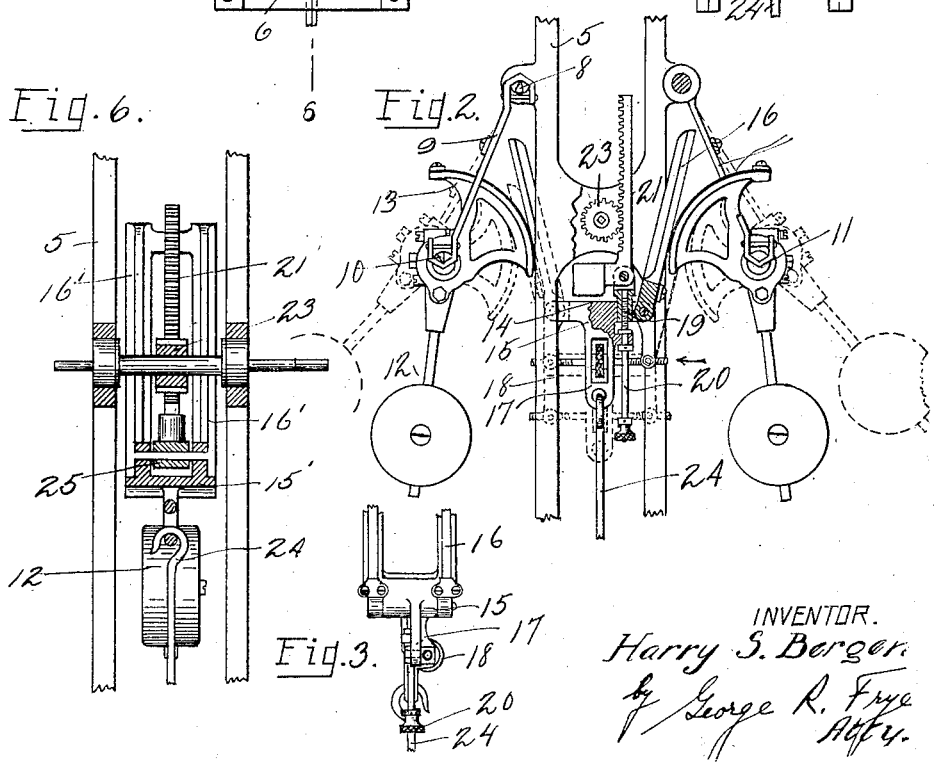

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

WEIGHING-SCALE.

1,378,087.  Specification of Letters Patent.  Patented May 17, 1921.

Application filed October 23, 1916. Serial No. 127,250.

*To all whom it may concern:*

Be it known that I, HARRY S. BERGEN, a citizen of the United States, residing at Toledo, in the county of Lucas and State of Ohio, have invented certain new and useful Improvements in Weighing-Scales, of which the following is a specification.

This invention relates to weighing scales, and more particularly to the weighing mechanisms thereof.

My invention is adaptable for use in many different types of scales but is of special benefit when employed in connection with scales of the pendulum type. One of the characteristics of scales of this type is that the scale must be maintained in level position with respect to the vertical, otherwise the weighing would be inaccurate in operation and the zero mark of the scale would not be accurately indicated by the index hand. My invention aims to overcome this objection by providing a construction whereby a pair of suspended pendulums moving simultaneously in opposite directions conjointly affect and equalize the movement transmitted to the index hand.

Among the objects of this invention are the provision of a flexibly connected self-compensating pendulum weighing mechanism; the arrangement in a weighing mechanism of this type whereby the pull exerted upon the pendulum mechanism is directly applied to the indicating mechanism; and the provision of a simple, inexpensive and efficient weighing mechanism in a compact space.

With the above and other objects in view which will be apparent as the description progresses, my invention consists in the novel construction, combination and arrangement of parts to be hereinafter more fully described and particularly pointed out in the appended claims.

Referring to the drawings illustrating a preferred embodiment of my invention and wherein similar reference numerals designate similar parts throughout the several views:—

Figure 1 is a front view of a scale equipped with my improved weighing mechanism; Fig. 2 is an enlarged front view, partly in section, of the weighing mechanism; Fig. 3 is a side view of the lower portion of the frame; Fig. 4 is a front view of another form of my improved weighing mechanism; Fig. 5 is a side view thereof; and Fig. 6 is a vertical section on the line 6—6 of Fig. 4.

Referring more specifically to the drawings, 1 designates the usual scale housing incasing the weighing mechanism of the scale and supported upon a column 2 resting upon the base 3 inclosing the usual platform levers (not shown) on which is mounted the platform 4. A frame is secured within the housing 1 and comprises four vertically-disposed pillars 5 connected together by means of cross-bars 6, each of said pillars being formed with a lug 7 adjacent the upper end thereof. Journaled within these lugs 7 are knife-edge pivots 8 supporting the stirrups 9 carrying the fulcrum pivots 10 of the pendulum shafts 11 in the lower end thereof. A pendulum stem 12 is fixed upon said shaft 11 and extends downwardly therefrom. A cam segment 13 is mounted upon the shaft 11 and is adjustably connected to the pendulum stem 12.

A vertically-movable guide frame 14 is suspended from the segments 13 by means of flexible metallic ribbons passing over the arcuate faces of the cams, the guide frame preferably comprising an equalizing base 15 having pivotally mounted thereto a plurality of track members 16 which may be formed as bell-crank levers. Depending downwardly from the base 15 is a lug 17 having journaled therein a substantially horizontal adjustment screw 18, the ends of which are screw-threaded in the lower arms of the track members 16. It will be seen that the angle of the tracks may be changed to effect changes in the amount of travel of the pendulums by virtue of this adjustment. If after such adjustment has been made the index hand does not coincide with the zero indication on the chart, provision is made for adjusting the initial position of the index hand, comprising a bracket 19 mounted for vertical movement in the equalizing base 15 and adapted to receive the threaded upper end of an adjustment screw 20 rotatably mounted in a projection 17'. The rack 21 is pivotally mounted in the bracket 19, and preferably has a transversely extending arm provided with a weight which normally tends to keep the rack in engagement with a pinion 23 fixed on the same shaft as the indicating hand 22 mounted concentrically of the chart bearing the weight indications. The guide member 14 is connected to the usual platform levers (not known) by means of the steelyard 24.

Referring to the embodiment shown in Figs. 4, 5 and 6, the track members 16' are formed integral with the equalizer base 15' and are not provided with angular adjustments. The rack adjustment provides a vertical screw 20' mounted in the rack foot 25 and directly threading into an aperture in the lower end of the rack bar 21'.

It is to be understood that my improved weighing mechanism is adaptable for use with platform lever mechanisms of various kinds, there being several types of lever mechanism now on the market well adapted for use with my pendulum weighing device.

In operation, when a commodity is placed upon the platform 4, a pull is exerted upon the steelyard rod 24 through the platform lever mechanism, this pull being transmitted to the guide 14, which in turn actuates the pendulums and the rack rod 21. Thus, when the base of the guide frame 14 is pulled downwardly the segments 13 of the pendulums are rocked inwardly, swinging the pendulous weights upwardly and outwardly to positions offsetting the weight of the commodity upon the scale platform, and simultaneously lowering the rack rod 21 to rotate the index hand to a position on the chart indicating the weight of such commodity. When the commodity is removed from the scale platform the pendulum weights will fall to their original positions, restoring the guide frame 14 and connected mechanism.

While it will be apparent that the illustrated embodiment of my invention herein disclosed is well adapted to adequately fulfil the objects primarily stated, it is to be understood that the invention is susceptible to modification, variation and change without departing from the spirit and scope of the invention as set forth in the subjoined claims.

Having described my invention, I claim:

1. In a weighing scale and in combination with the indicating mechanism thereof, a vertically-movable frame, a rack arranged thereon to actuate the indicating mechanism, means for adjusting the position of the rack vertically relative to the frame, a load-offsetting pendulum and knife edge pivots on which said pendulum is mounted, said pendulum being connected to and adapted to roll upon the vertically-movable frame.

2. In a weighing scale and in combination with the indicating mechanism thereof, a vertically-movable frame, a rack arranged thereon to actuate the indicating mechanism, means for adjusting the position of the rack vertically relative to the frame, a pair of load-offsetting pendulums and knife-edge pivots upon which said pendulums are mounted, said pendulums being connected to the opposite sides of the frame and adapted to roll thereon.

3. In a weighing scale and in combination with the indicating mechanism thereof, a vertically-movable frame arranged to actuate the indicating mechanism, a load-offsetting pendulum secured to and adapted to roll upon the vertical frame, and means for adjusting the angularity of that portion of the frame engaging the pendulum.

4. In a weighing scale and in combination with the indicating mechanism thereof, a vertically-movable frame arranged to actuate the indicating mechanism, a pair of load-offsetting pendulums secured to the opposite sides of the frame and adapted to roll thereon, and means for adjusting the angularity of the sides of the frame.

5. In a weighing scale and in combination with the indicating mechanism thereof, a vertically-movable frame arranged to actuate the indicating mechanism, a pair of load-offsetting pendulums secured to the opposite sides of the frame and adapted to roll thereon, and means for simultaneously adjusting the angularity of the sides of the frame.

6. In a weighing scale and in combination with the indicating mechanism thereof, a vertically-movable frame arranged to actuate the indicating mechanism, a frame, links pivoted upon the frame, a pair of load-offsetting pendulums supported in the links and connected with the sides of the movable frame, and means for changing the angularity of the sides of the frame.

7. In a weighing scale and in combination with the indicating mechanism thereof, a vertically-movable frame arranged to actuate the indicating mechanism, a frame, links pivoted upon the frame to swing laterally, a pair of load-offsetting pendulums supported in the links and connected with the sides of the movable frame, and means for adjusting the sides of the frame to change its lateral extent.

8. In a weighing scale and in combination with the indicating mechanism thereof, a vertically-movable frame arranged to actuate the indicating mechanism, a frame, links arranged in pairs and pivoted upon the frame, load-offsetting pendulums having their fulcrum pivots supported in adjacent pairs of links, a vertically-movable frame arranged between the pendulums and of a width to normally force the fulcrum pivots outwardly from vertical alinement with the connections of the links with the frame, segments on the pendulums, and means for securing the pendulums to the frame whereby the segments will roll thereon.

9. In a weighing scale and in combination with the indicating mechanism thereof, a vertically-movable frame arranged to actuate the indicating mechanism, a frame, links arranged in pairs and pivoted upon the frame, load-offsetting pendulums having their fulcrum pivots supported in adjacent pairs of links, a vertically-movable frame arranged between the pendulums and of a width to normally force the fulcrum pivots outwardly from vertical alinement with the connections of the links with the frame, and means for securing the pendulums to the frame whereby the pendulums will move vertically on the frame during the operation of the scale.

10. In a scale and in combination with the indicating mechanism thereof, a pair of flexibly suspended pendulums, a vertically-movable guide arranged between and connected with said pendulums, and a rack rod adjustably mounted upon said guide and adapted to actuate the indicating mechanism of the scale upon movement of said guide.

HARRY S. BERGEN.

Witnesses:
GEORGE R. FRYE,
C. F. MILLER, Jr.